J. W. WATSON.
MOTION CONTROLLING MECHANISM.
APPLICATION FILED MAR. 21, 1918.
1,345,814.
Patented July 6, 1920.
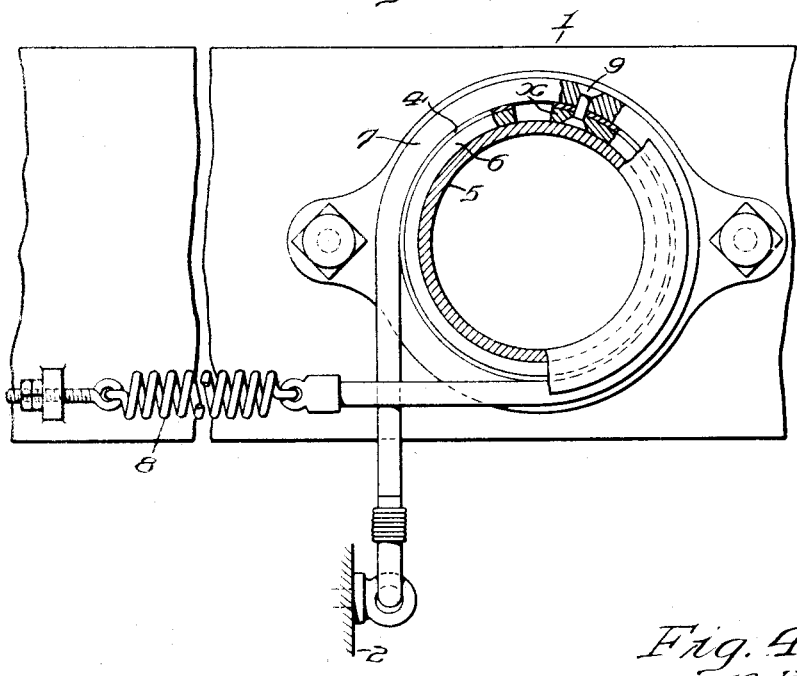
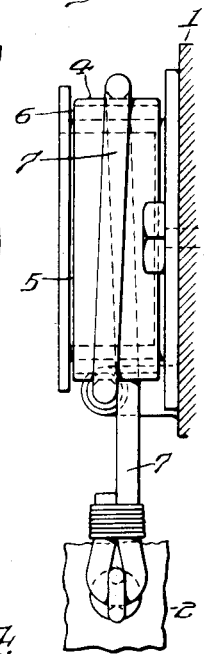
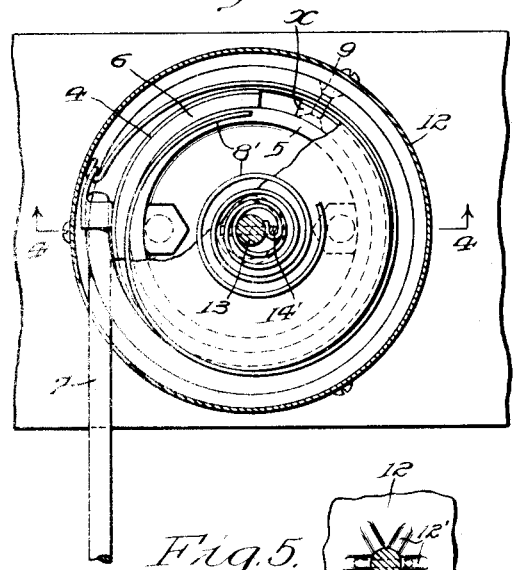
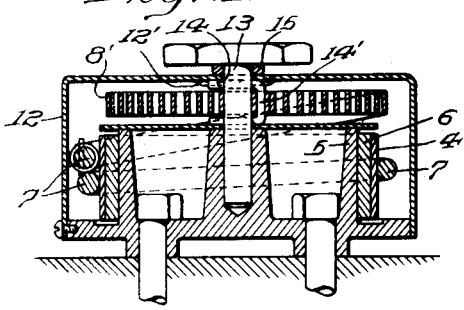
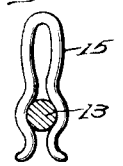
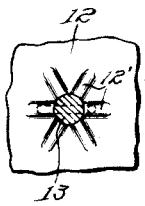
INVENTOR
John W. Watson.
WITNESS

UNITED STATES PATENT OFFICE.

JOHN W. WATSON, OF WAYNE, PENNSYLVANIA.

MOTION-CONTROLLING MECHANISM.

1,345,814.  Specification of Letters Patent.  Patented July 6, 1920.

Application filed March 21, 1918. Serial No. 232,764.

*To all whom it may concern:*

Be it known that I, JOHN W. WATSON, a citizen of the United States, and a resident of Wayne, in the county of Delaware and State of Pennsylvania, have invented certain new and useful Improvements in Motion-Controlling Mechanism, of which the following is a specification.

This invention relates to a novel combination for controlling or regulating relative movement between any two elements by use of frictionally engaging members in combination with means to both effectively force said members into motion-resisting engagement and also insure positive relative movement between said members during relative movement of said elements in one direction, with single means to both disengage said members and relatively move them during relative movement between said elements in another direction. Such a mechanism has a wide range of use as will be readily apparent to those skilled in the art.

An important object of my invention is to provide a friction mechanism, for the purpose as stated above, which will stand up satisfactorily and give long service in whatever duty it may be used. In order to accomplish the above, such a combination of parts is provided, and the parts are so arranged, as to allot to the friction member (member 6 in the embodiment shown) the primary function of generating friction and of resisting the wear resulting from this friction. In other words this friction member is given no major function to perform in addition to its own particular function as above. Thus, its frictional and wear resisting qualities need not in any way be handicapped as would be the case if a compromise had to be made in its structure or quality in order to also render it capable of performing some additional function or functions. Its duty being thus limited to a single and specific major function, this friction member may be made in a form and of a material and of a quality which particularly adapts it for its own particular and important work. In this, the mechanism shows marked improvement in so far as endurance and hence practical value is concerned, over any mechanism in which the friction member is also called upon to do other major duty, such as, for example, tension duty. Where any one member must be made to perform several different forms of duty, such member, as a rule, is a compromise and hence is not fully or perfectly suited for the correct performance of any one of these duties. Likewise, the tension member 7, in the embodiment shown, has but a single major function to perform. In the design and in the selection of material for this member, therefore, no considerations other than those of flexibility, tensile strength and weather proofing need be given. As this member is not called upon to generate friction or to resist wear or to perform any other such major function, no such attendant compromises need be made in its design or in the material of which it is constructed. Thus, again, it is seen that a particular object of this invention is to provide a mechanism which will give long service and satisfaction in use.

Various combinations of elements and radically different means could be readily employed to obtain the results secured by the mechanism disclosed, without departing from the spirit and scope of this invention, the illustrations being merely by way of example.

One type of the invention is shown by the accompanying drawings in which Figure 1 is a sectional view partly in elevation of one embodiment of this type. Fig. 2 is an elevation view of this same embodiment. Fig. 3 is a sectional view of a slightly modified embodiment of this same type. Fig. 4 is a cross sectional view thereof at the line 4—4 in Fig. 3 looking in the direction of the arrows. Figs. 5 and 6 are constructional details of this latter embodiment.

Referring to the embodiment shown in Figs. 1 and 2, illustrating one means for carrying the invention into effect, 1 and 2 represent relatively movable elements, whose motion in any direction, one relative to the other, it is desired to check, regulate or control. These elements are illustrated merely diagrammatically for the purpose of indicating that this invention may be applied and utilized in connection with any elements which move one relative to the other and whose movement it is desired to effectively control.

A drum 5 is carried by the element 1 and around this drum is shown a friction band 6 which may be provided with a backing 4 of steel or other suitable material. A cord 11 7 is located around the band 6 and is connected at one end to the other element 2, the other end of the cord 7 being connected to suitable tensioning means, such as the coil spring 8 connected in this case to the movable element 1, and, said tensioning means may be made adjustable as shown, if desired. The friction band 6, in the form illustrated herein, is made as an incomplete ring, and the cord 7 is attached thereto at 9 or the same may be attached at any other suitable point on the band 6. The drum 5 and friction band 6 constitute one type of frictionally engaging members, although it is apparent that these members may be made in any other shape than that of a drum or incomplete ring and relatively associated in various other ways than that just described and still incorporate therein the essentials of my invention.

The mechanism operates so as to cause no resistance to the movement between the elements 1 and 2 in one direction but to check and control their relative movement in another direction, as, for example, upon approach or separation of the elements 1 and 2 or upon any relative movement between any two points on these elements, such as the points of connection of the members 5 and 6 with each. As shown, the invention is so connected with the elements 1 and 2 as to control or regulate their separation.

It will be seen by reference to Figs. 1 and 2 that spring 8, through cable 7, is constantly pulling clockwise on end $x$ of the friction band 6 and is consequently constantly tending to open up the band from around the drum and also cause the band to slide in a clockwise direction with relation to the drum. Therefore, the instant the elements 1 and 2 move (approach in this case) so that the cable 7 ceases to hold back end $x$ of the band against the pull of the spring 8, instantly spring 8, through cable 7, operates to slide the band clockwise around the drum. This sliding takes place to whatever extent is allowed by the movement of the elements 1 and 2. Now, when elements 1 and 2 start to move in such a way as to draw on cable 7—in this case when the elements separate— cable 7 pulls counterclockwise at end $x$ of the friction band 6 causing it to bind around drum 5, depending upon the tightness with which the other end of cable 7 is held around the band by the strength of spring 8. Continued separation of elements 1 and 2 then causes cable 7 to pull band 6 counterclockwise around the drum. Any desired resistance to movement in this direction between band 6 and drum 5 may be secured by adjustment of the spring 8. Thus, any desired resistance to relative separation of the elements 1 and 2 is secured.

It will be noted that any form of means other than the spring 8 could be used to accomplish the functions performed thereby, such means being effective to both constantly tend to lessen the relative engagement between the friction members and relatively move them—while the manner in which the member 6 is associated with the movable element 2 may be widely varied from that illustrated herein and still operate to bind the members 5 and 6 into frictional engagement, and also insure a positive relative movement under resistance during relative movement of the elements 1 and 2 to be controlled.

In the modified form of the present type of the invention shown in Figs. 3, 4, 5 and 6, the tensioning means for the cable 7 is in the form of a spirally wound spring 8' and substantially the entire device may be self-contained within a casing 12. The outer end of the spring 8' is connected in any desired manner to an end of the cord 7 as in the other embodiment, the inner end of the spring 8' being also connected to suitable adjustable retaining means. Such a means is shown in this embodiment in the bolt 13 passing through the casing 12 into a hub within the drum 5, the casing 12 adjacent the opening for the bolt 13 being crimped or radially corrugated at 12' (see Fig. 5) so as to adjustably hold the spring 8' under any desired tension by coöperating with means such as a pin 14 on the bolt 13, the pin 14 being one end of the staple 14' which holds the inner end of the spring 8' in position. By turning the bolt 13 the spring 8' may be wound up or unwound to vary its tension as desired, the casing 12 warping sufficiently to permit the pin 14 to pass or ride over the corrugations 12'. A locking pin 15—shown in Fig. 6—may be inserted between the head of the bolt 13 and the outside of the casing 12 to lock the pin 14 against rotation and positively secure the spring in any set position by preventing deflection or warping of the casing 12 which is necessary to permit rotation of the bolt 13 and consequent adjustment of the spring 8'.

It will be readily apparent that the embodiment shown in Figs. 3, 4, 5 and 6 operates the same as does the embodiment shown in Figs. 1 and 2, binding the members 5 and 6 into motion-resisting engagement and relatively moving them when the elements 1 and 2 relatively move in one direction. Also this latter embodiment operates, as does the embodiment shown in Figs. 1 and 2, when the elements 1 and 2 move in another direction, to both disengage said members from motion-resisting contact and move said members freely one relative to the other.

Having thus described my invention, I claim and desire to protect by Letters Patent of the United States:

1. The combination of relatively movable members, means to cause frictional resistance to their relative movement in one direction, spring means tending to move said members away from frictional engagement when said members are moved in the opposite direction, said means also operating to relatively move said members in said last-mentioned direction.

2. The combination of relatively movable members, means to cause frictional resistance to their relative movement in one direction, means operative to positively relatively move said members in said direction and spring means operative to pull said members out of resisting engagement when said members are moved in the opposite direction, said means also operating to move said members in said last-mentioned direction.

3. In a motion check for movable elements, the combination of relatively movable members, and means, including a flexible member secured to one of said members, for causing resistance to the relative movement of said members in one direction, for positively effecting said relative movement of said members in said direction against said resistance and for permitting said members to move without resistance in another direction.

4. The combination of relatively movable members, means to bind said members into frictional engagement to resist their relative movement in one direction and spring actuated means effective to force said members out of motion-resisting engagement and move said members freely in another direction.

5. In a motion check, the combination of a drum and a brake-shoe and means connected to the brake-shoe constantly tending to lessen the relative engagement of the drum and brake-shoe, said means also constantly tending to slide the brake-shoe with relation to the drum.

6. The combination of relatively movable members, a cord around said members and means so associated therewith as to cause said members to be forced into motion-resisting engagement when said members are relatively moved in one direction and drawn out of motion-resisting engagement when said members are relatively moved in another direction.

7. In combination with two relatively movable elements, means to cause resistance to their relative movement in one direction, said means comprising frictionally engaged members, one being connected with one of said elements and another being connected with the other of said elements, and means constantly tending to both lessen the relative engagement of said members and relatively move them.

8. In combination with two relatively movable elements, means to cause resistance to their relative movement in one direction, said means comprising frictionally engaged members, one being connected with one of said elements and another being connected with the other of said elements, and tensioning means constantly tending to both lessen the relative engagement of said members and relatively move them.

9. In combination with two relatively movable elements, means to cause resistance to their relative movement in one direction, said means comprising frictionally engaged members, one being movable with one of said elements and the other being movable with the other of said elements, and a spring constantly tending to lessen the relative engagement of said members and constantly tending to cause them to slip one relative to the other.

10. Means for resisting relative motion between two elements in one direction, said means comprising frictionally engaged members, one adapted to be connected with one of said elements and another adapted to be connected with the other of said elements, and means constantly tending, when the members are operatively connected with the elements, to both lessen the relative engagement of said members and relatively move them.

11. Means for resisting relative motion between two elements in one direction, said means comprising frictionally engaged members, one adapted to be connected with one of said elements and another adapted to be connected with the other of said elements, and tensioning means constantly tending to both lessen the relative engagement of said members and relatively move them.

12. Means for resisting relative motion between two elements in one direction, said means comprising frictionally engaged members, one being movable with one of said elements and the other being movable with the other of said elements, and a spring constantly tending to both lessen the relative engagement of said members and relatively move them.

13. In a motion check, means to retard relative motion between two elements in one direction without interfering with their relative motion in the opposite direction, said means comprising a member adapted for connection to one of said elements, a band around said member, and a flexible member, said band being connected to said flexible member, said flexible member adapted to be connected at one of its ends to the other of said elements and at its other end to tensioning means.

14. In a recoil check for movable parts, the combination of relatively movable members, one in circumferential relation with the other, a cord partially in circumferential relation with said members, one end of said cord being adapted for connection to one of said movable parts, tensioning means adjacent the other end of said cord and means for connecting said cord and one of said members whereby said members will be forced into motion-resisting engagement when said parts are relatively moved in one direction and drawn out of motion-resisting engagement when said parts are relatively moved in another direction.

15. The combination of relatively movable members, means to cause frictional engagement of said members and tensioning means effective to release said engagement to the extent of permitting this same means to effect a relative movement between said members.

16. Means for controlling relative motion between two bodies in one direction, said means comprising relatively movable members, means to cause frictional resistance to their relative movement and flexible means effective, upon relative motion of the bodies in the opposite direction, to lessen the frictional resistance between said members to a degree sufficient to permit this same means to effect a relative movement between said members.

17. In mechanism adapted to retard relative movement between relatively movable elements, a brake drum positively connected to one of said elements, a brake band in contact with said brake drum and a flexible member in circumferential relation with said brake band and connecting said brake band to another of said elements and means to cause said brake band to grip said brake drum when the elements are relatively moved in a predetermined direction.

18. In combination, relatively movable friction members, a spring connected to one of said friction members and tending to move said member in one direction relative to another of said friction members, and a flexible member enfolding a portion of said first mentioned friction member and operative to transmit power to move said member in another direction relative to said other friction member.

19. In mechanism for retarding relative motion between relatively movable elements in one direction only, a brake drum and a friction band, one positively connected to one of said elements and the other positively connected to the other of said elements, and a spring so associated with said brake drum and said friction band as to constantly tend to relatively move them, said drum and band being so associated as to cause them to, at all times over their respective entire circumferential lengths, coincide with a plane perpendicular to their axis and so associated as to maintain constant the amount of area on the drum contacted by the brake band and both the amount and location of area on the brake band contacted by the drum during any movement between the elements within predetermined limits.

20. In mechanism for retarding relative motion between relatively movable elements in one direction, a drum in fixed relation with one of said elements, a combined friction and tension member attached to the other of said elements and a spring connecting said combined friction and tension member with the first mentioned element and constantly tending to move said combined friction and tension member with relation to said drum, said combined friction and tension member being coiled upon said drum and upon itself and remaining so coiled regardless of whatever movement takes place between the elements within predetermined limits.

21. In mechanism for retarding motion between two relatively movable elements, a non-revoluble drum in fixed relation with one of said elements and a brake band in contact with said drum and in circumferential relation therewith and positively connected with said other element, said brake band being so associated with said drum as to cause no variation in the amount of area on the drum contacted by the brake band, and no variation in either the amount or location of area on the brake band contacted by the drum during any movement between the elements within predetermined limits.

22. In mechanism for retarding motion between relatively movable elements, a drum affixed to one of said elements, a brake band in circumferential relation with said drum and adapted to be moved in one direction with relation to said drum by a member in circumferential relation with said brake band and connecting said brake band to the other element, and a spring connected with and adapted to move said brake band in the opposite direction with relation to said drum.

23. In mechanism for retarding relative motion in one direction between relatively movable elements, a drum affixed to one of said elements, a friction member in circumferential relation with said drum, said friction member being partially surrounded by and attached to a flexible member, which flexible member is attached to the other element, and a spring connecting said friction member with said first mentioned element.

24. In mechanism adapted to control relative motion between two elements, a member adapted to be connected to one of said elements, a flexible member in contact with said first mentioned member and adapted to be mechanically connected to said other element by a member enfolding a portion of said flexible member, automatic means for relatively moving said first mentioned member and said flexible member in one direction and means for maintaining, throughout any relative movement between said elements in one direction within predetermined limits, the same total contacting friction surface of one of said members in contact with the other.

25. In a motion check for relatively movable elements, a drum adapted to be secured to one of said elements, a friction member, in the form of a split ring, in contact with said drum, a tension member secured to said friction member and to said other element, and a spring connecting said drum and said friction member, the parts being so arranged as to allot to the friction member the major function of generating friction and resisting the wear from said friction, and to the tension member, the major function of transmitting power.

26. Adapted for use in connection with two relatively movable elements, for the purpose of checking their relative movement in one direction, a drum adapted to be attached to one of said elements, a flexible tension member adapted to be attached to the other of said elements, a friction member attached to said tension member and partially surrounding said drum, and a spring connected to said friction member and to said drum.

27. The combination in a motion-retarding device of a drum; a friction shoe for said drum; a tension member wound on and positively connected to said shoe; a member between said shoe and said tension member for reducing the friction between them; and a spring operative to cause movement of the shoe and tension member around the drum under predetermined conditions.

28. The combination in a motion-retarding device of a drum; a friction shoe for said drum; a tension member wound on and positively connected to said shoe; a metallic strip interposed between said shoe and said tension member; and a spring operative to cause movement of the shoe and tension member around the drum under predetermined conditions.

29. The combination in a motion-retarding device of a drum; a friction shoe for said drum; a tension member wound on and positively connected to said shoe, said shoe having a backing for reducing the friction between said shoe and said tension member; and a spring operative to cause movement of the shoe and tension member around the drum under predetermined conditions.

30. The combination in a motion-retarding device of a drum; a friction shoe for said drum; a tension member wound on and positively connected to said shoe, said shoe having a metallic backing for reducing the friction between said shoe and said tension member; and a spring operative to cause movement of the shoe and tension member around the drum under predetermined conditions.

In witness whereof I have hereunto set my hand this 19th day of March, A. D. 1918.

J. W. WATSON.